(12) United States Patent
Erickson et al.

(10) Patent No.: US 6,619,897 B2
(45) Date of Patent: Sep. 16, 2003

(54) ERROR PROOFING METHOD AND APPARATUS FOR CUTTING TOOLS

(75) Inventors: Robert A. Erickson, Raleigh, NC (US); Kenneth R. Mullins, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/190,969

(22) Filed: Jul. 8, 2002

(65) Prior Publication Data

US 2003/0024131 A1 Feb. 6, 2003

Related U.S. Application Data

(60) Provisional application No. 60/304,686, filed on Jul. 11, 2001.

(51) Int. Cl.[7] .............. B23C 1/00; B23B 29/00; F16B 21/00
(52) U.S. Cl. .............. 409/234; 409/232; 409/233; 82/160; 403/322.1
(58) Field of Search .............. 409/234, 232, 409/233; 82/36, 36 A, 160; 403/263, 361, 354, 356, 358

(56) References Cited

U.S. PATENT DOCUMENTS

| 4,135,418 | A | | 1/1979 | McCray et al. ............. 82/36 A |
|---|---|---|---|---|
| 4,573,824 | A | * | 3/1986 | Ehle ..................... 403/322.1 |
| 4,575,293 | A | | 3/1986 | Berti ..................... 409/234 |
| 4,723,877 | A | | 2/1988 | Erickson ................. 409/234 |
| 4,736,659 | A | * | 4/1988 | Erickson ................. 82/160 |
| 4,747,735 | A | | 5/1988 | Erickson et al. .......... 409/234 |
| 5,173,017 | A | * | 12/1992 | Oshnock et al. .......... 409/234 |
| 5,209,146 | A | | 5/1993 | Armbrust et al. ......... 82/160 |
| 6,045,308 | A | * | 4/2000 | Frank et al. ............. 409/234 |
| 6,276,879 | B1 | * | 8/2001 | Hecht .................... 409/234 |

* cited by examiner

Primary Examiner—A. L. Wellington
Assistant Examiner—Dana Ross
(74) Attorney, Agent, or Firm—Larry R. Meenan

(57) ABSTRACT

An apparatus and method for aligning a clamping unit and a toolholder to facilitate proper positioning of a cutting tool with respect to a workpiece.

18 Claims, 8 Drawing Sheets

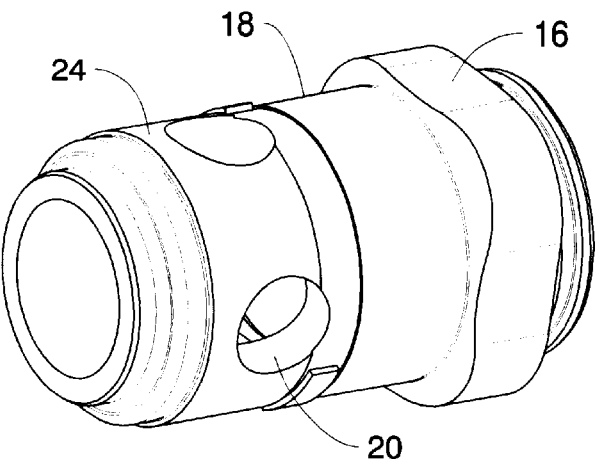
FIG. 19
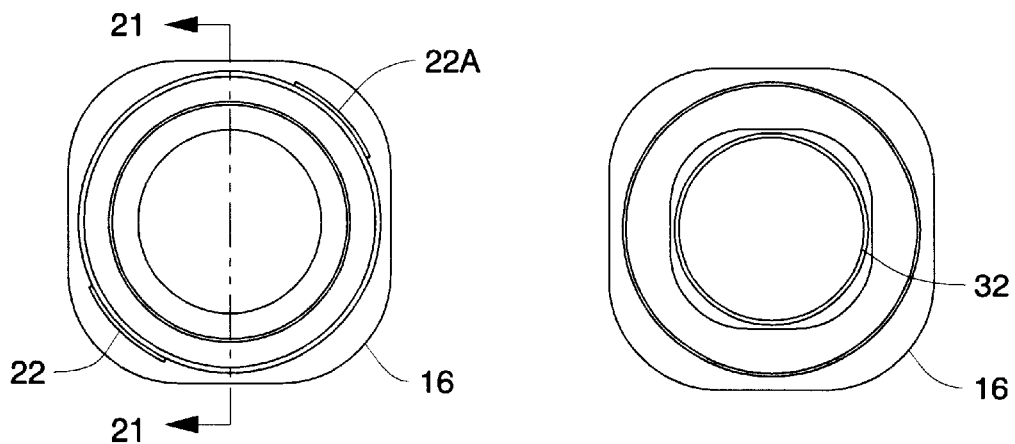
FIG. 20
FIG. 22
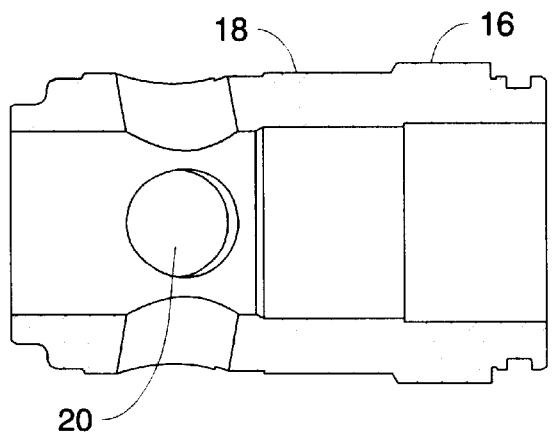
FIG. 21

ERROR PROOFING METHOD AND APPARATUS FOR CUTTING TOOLS

This application is a nonprovisional application of U.S. Provisional Application No. 60/304,686, filed Jul. 11, 2001.

BACKGROUND OF THE INVENTION

1. Field of the Invention

This invention relates to an error proofing method and apparatus for cutting tools. More particularly, this invention relates to an error proofing method and apparatus for cutting tools insuring that cutting tools, when changed, are placed in their proper radial orientation within a clamping unit.

2. Description of the Related Art

There are known mechanisms for releasably holding a toolholder shank in a support member bore when the mechanism actuating member is transversely aligned with respect to the longitudinal axis of the toolholder shank and a support member bore. Such mechanisms and articles are used in the cutting and shaping of workpieces where it is not expedient to use the tool support member in connection with a base member having a bore containing an axially aligned power driven means for axially actuating the locking mechanism in the tool support member. Examples of toolholders and support members utilizing releasable locking mechanisms having radial activation are shown in U.S. Pat. Nos. 4,573,824; 4,575,293 and 4,135,418 and 4,736,659. There is, however, always a need for improved mechanisms in this field for aligning the toolholder and the clamping unit. The present invention ensures a concentric aligned fit between the toolholder and the clamping unit

SUMMARY OF THE INVENTION

Briefly, according to this invention, there is provided an error proofing method and apparatus for aligning a clamping unit and a toolholder to facilitate proper positioning of a cutting tool with respect to a workpiece.

BRIEF DESCRIPTION OF THE DRAWINGS

Further features of the present invention, as well as the advantages derived therefrom, will become clear from the following detailed description made with reference to the drawings in which:

FIG. 19 is a perspective view of another 4-ball clamping unit in accordance with the present invention;

FIG. 20 is an end view of the clamping unit of FIG. 19;

FIG. 21 is a cross sectional view of the clamping unit of FIG. 20 taken along line A—A; and FIG. 22 is an end view of the clamping unit of FIG. 19.

DESCRIPTION OF THE PREFERRED EMBODIMENT

Figure 1:
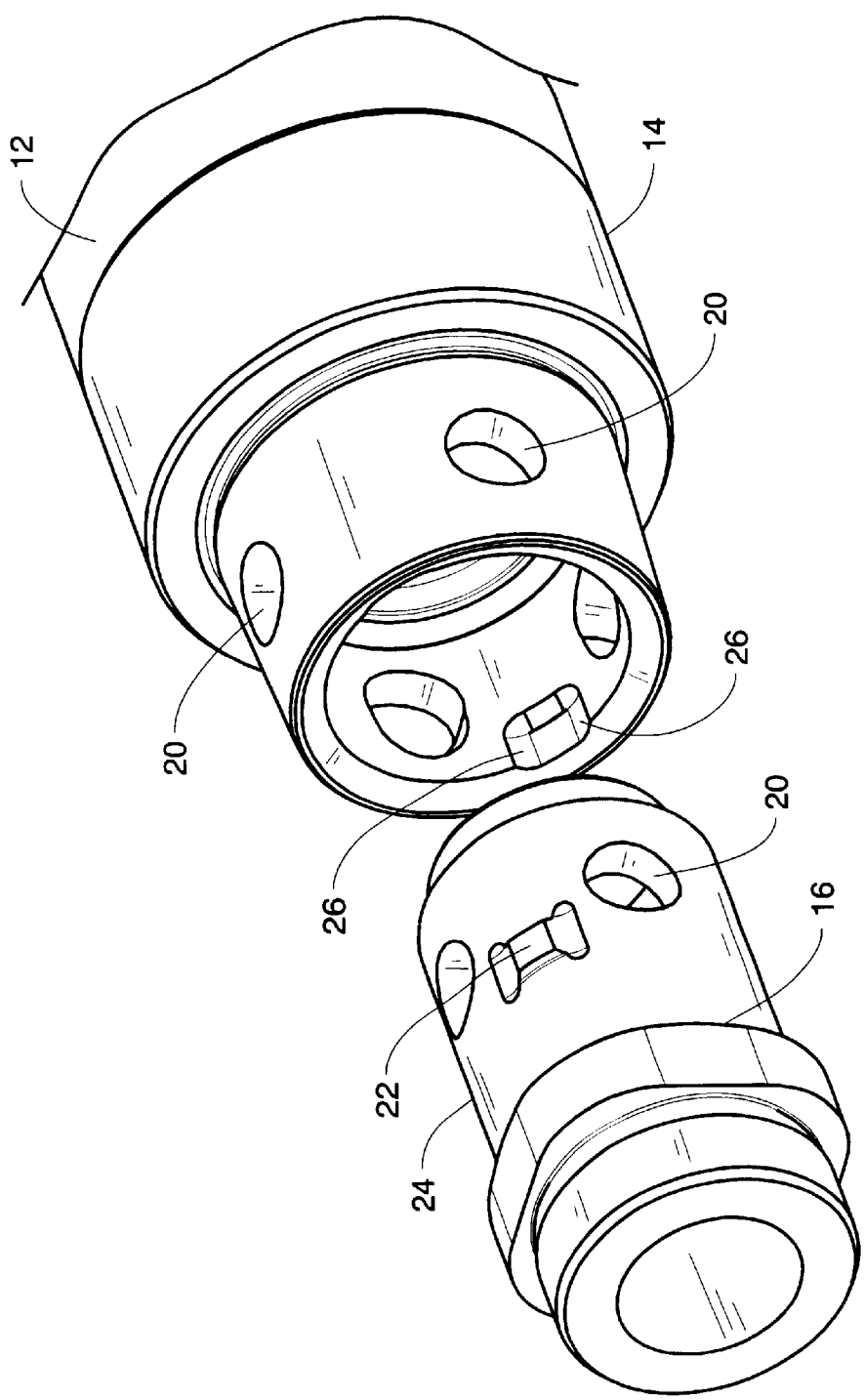
FIG. 1 is an exploded perspective view of a toolholder and clamping unit in accordance with the present invention.
Figure 2:
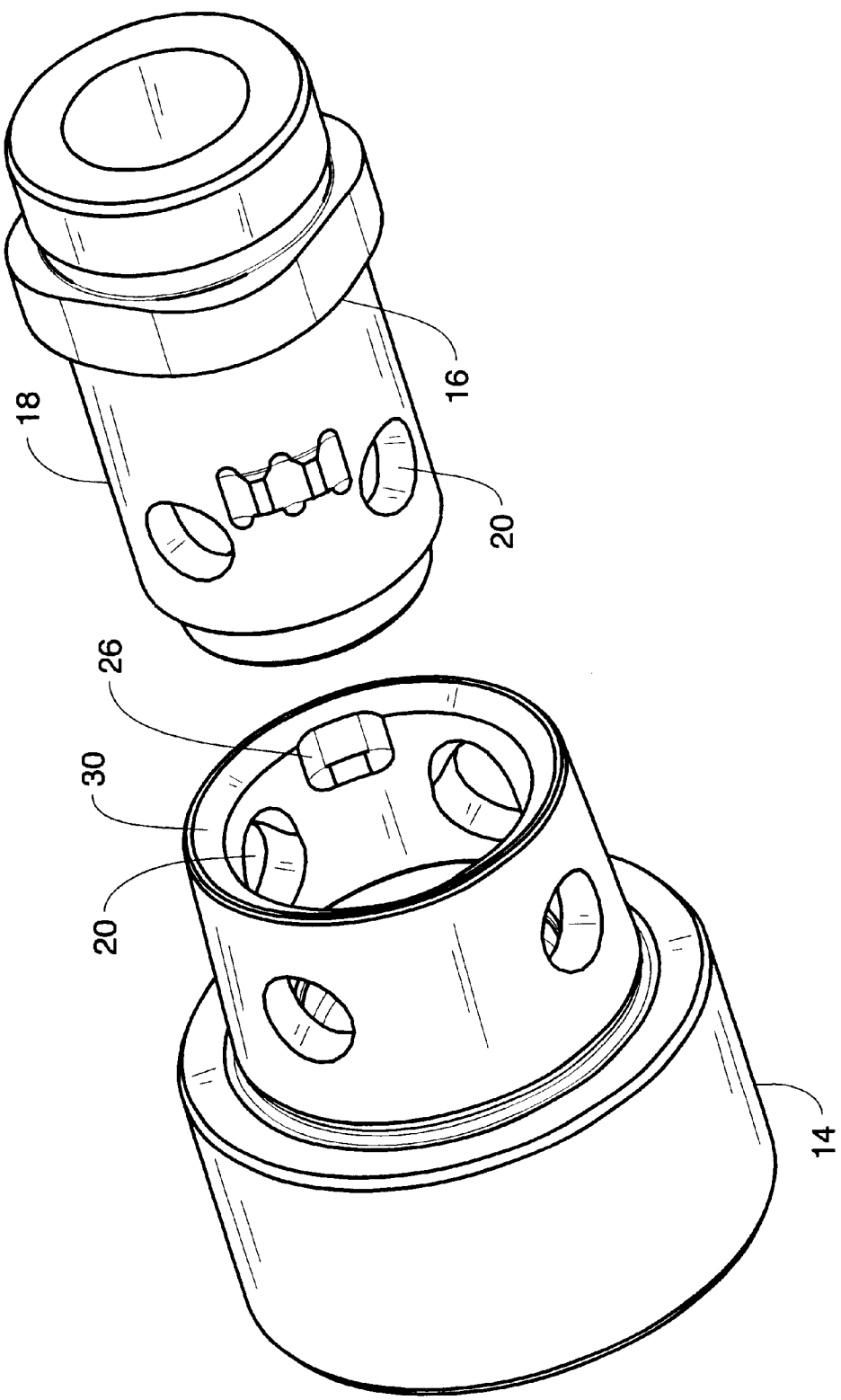
FIG. 2 is another exploded perspective view of the toolholder and clamping unit of FIG. 1.
Figure 3:
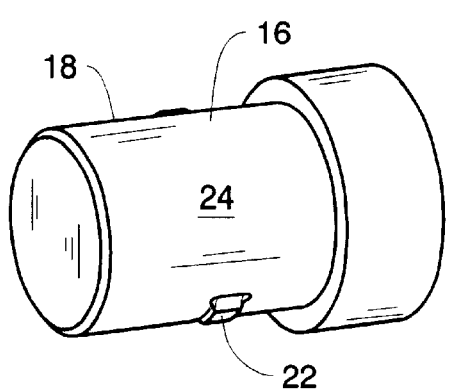
FIG. 3 is a perspective view of the clamping unit of FIG. 1.
Figure 7:
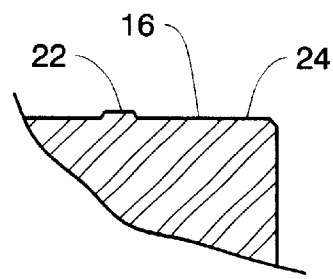
FIG. 7 is a cross sectional view of the clamping unit of FIG. 4 taken along line C—C.
Figure 5:
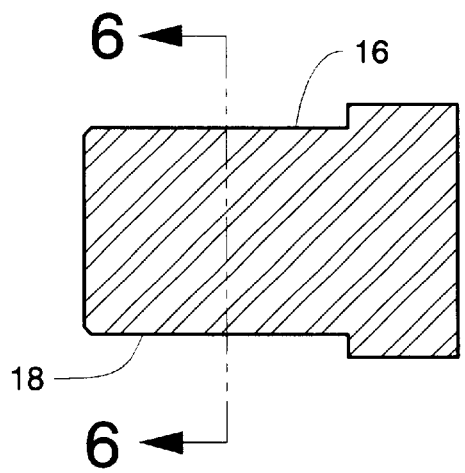
FIG. 5 is a cross sectional view of the clamping unit of FIG. 4 taken along line A—A.
Figure 4:
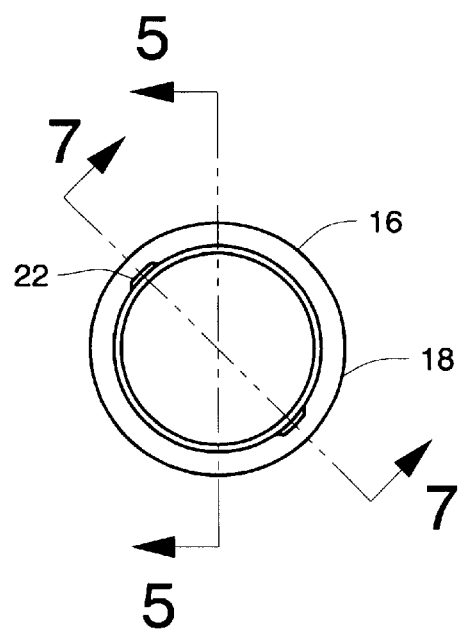
FIG. 4 is an end view of the clamping unit of FIG. 3.
Figure 6:
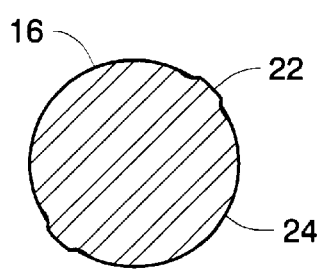
FIG. 6 is a cross sectional view of the clamping unit of FIG. 5 taken along line B—B.
Figure 8:
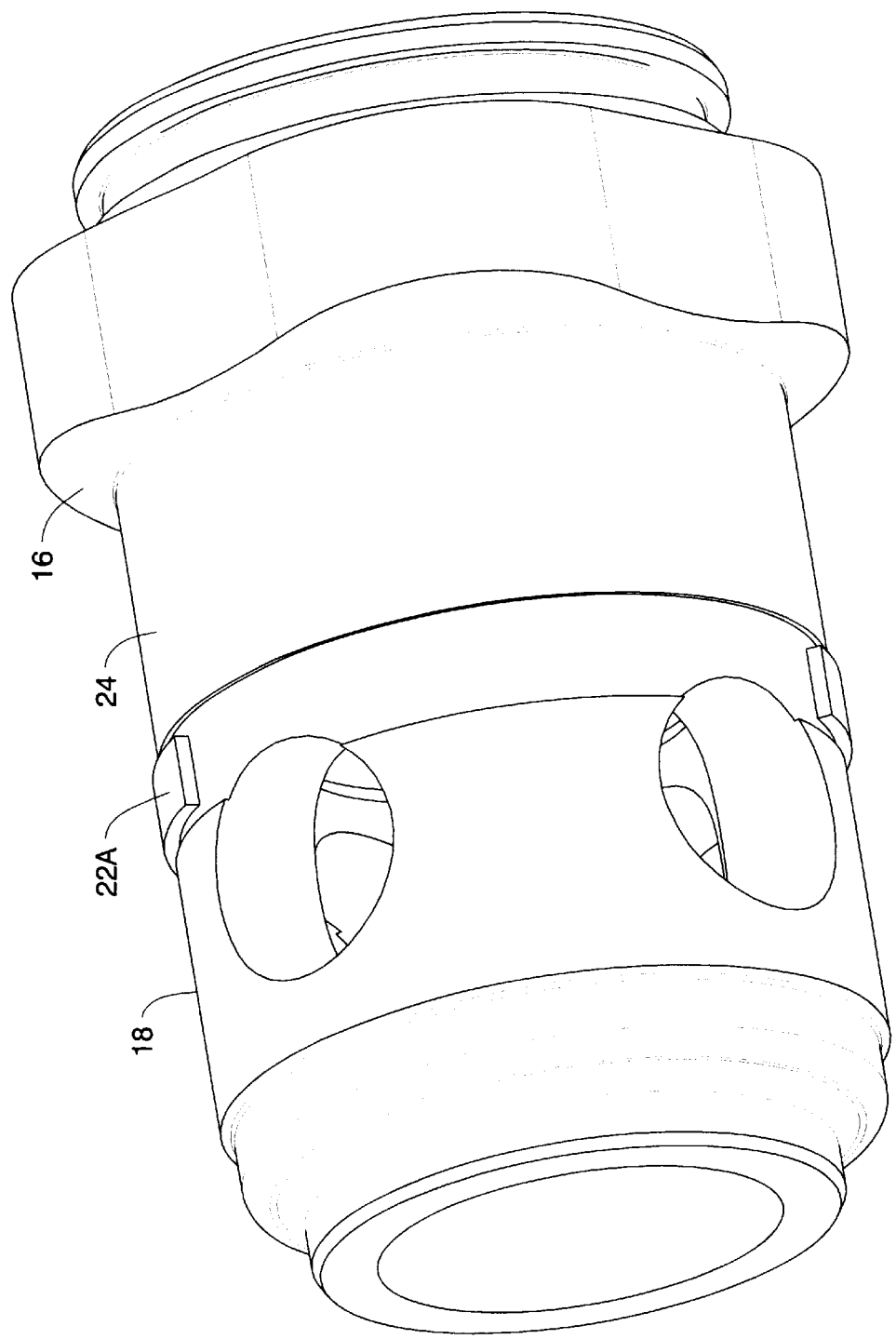
FIG. 8 is an enlarged partial perspective view of the clamping unit of FIG. 1.
Figure 9:
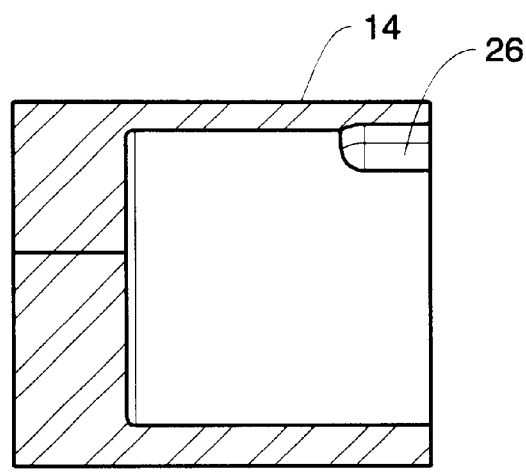
FIG. 9 is a cross section side view of the toolholder of FIG. 1.
Figure 10:
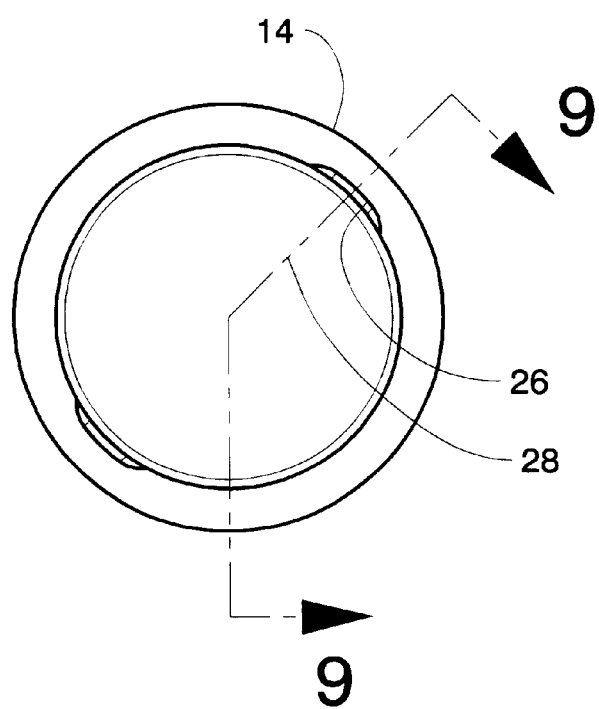
FIG. 10 is an end view of the toolholder of FIG. 1.
Figure 11:
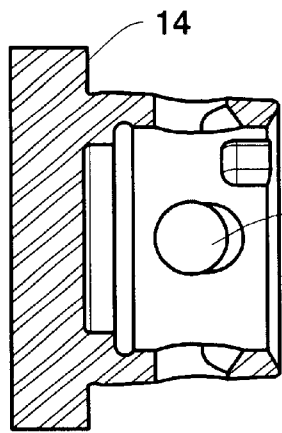
FIG. 11 is a cross sectional view of a 4-ball taper lock toolholder in accordance with the present invention.
Figure 12:
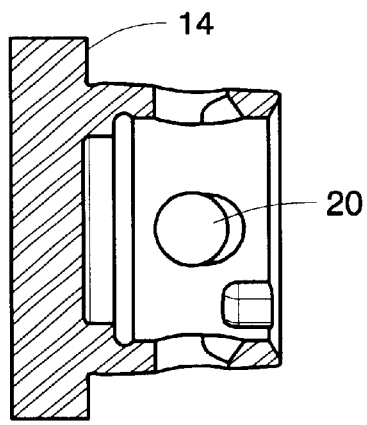
FIG. 12 is another view of the toolholder of FIG. 11 illustrating the position of the balls.
Figure 13:
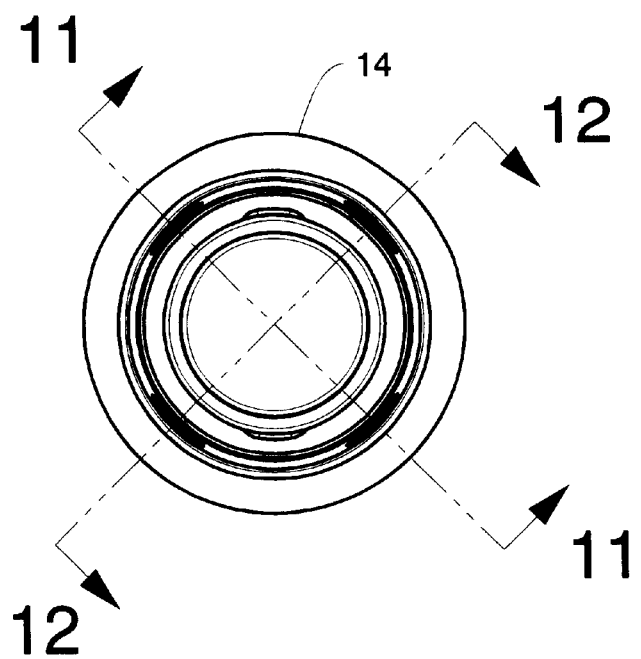
FIG. 13 is an end view of the toolholder of FIG. 11.
Figure 14:
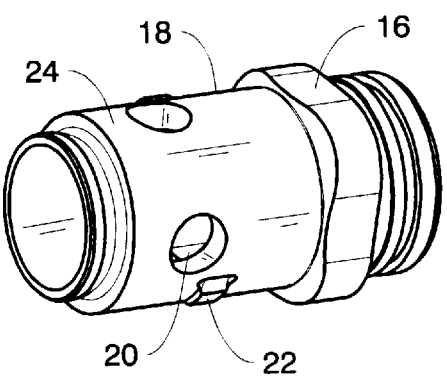
FIG. 14 is a perspective view of the 4-ball clamping unit in accordance with the present invention.
Figure 16:
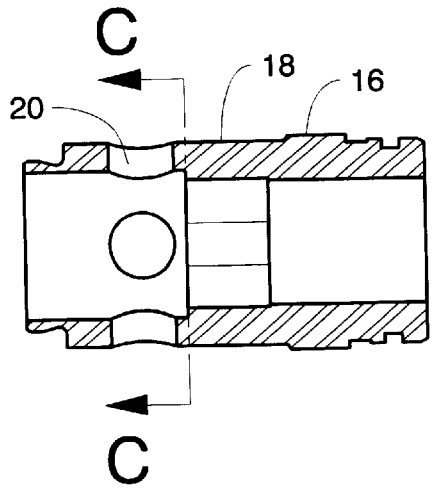
FIG. 16 is a cross sectional view of the clamping unit of FIG. 15 taken along line A—A.
Figure 15:
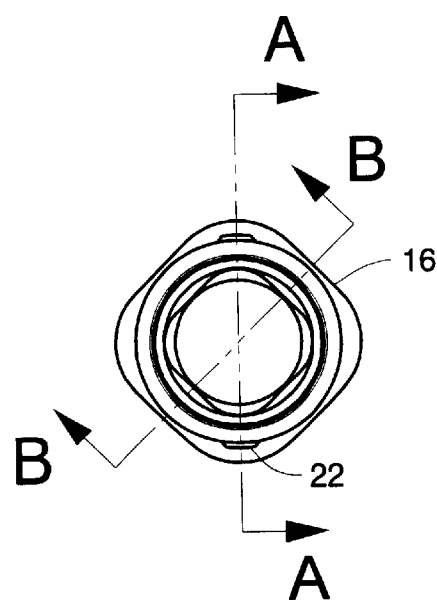
FIG. 15 is an end view of the clamping unit of FIG. 14.
Figure 17:
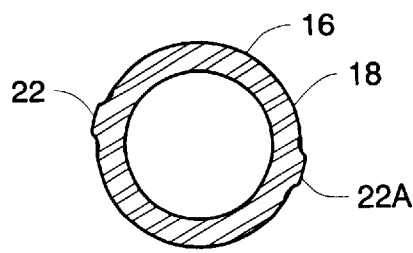
FIG. 17 is a cross sectional view of the clamping unit of FIG. 16 taken along line B—B.
Figure 18:
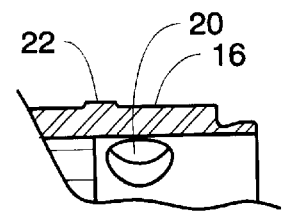
FIG. 18 is a partial cross sectional view of the clamping unit of FIG. 15 taken along line C—C.

Referring to the drawings, wherein like reference characters represent like elements, there is shown an error proofing apparatus 10 for a cutting tool 12 and a method using the apparatus. Cutting tools typically include a cutting insert that is detachably secured to a toolholder 14 as well known in the prior art. Such cutting tools 12 may be used in machining operations where a workpiece (not shown) is rotated relative to the cutting insert to groove, slot, profile or even cut off the workpiece by forcefully engaging the cutting edge of the insert against the rotating workpiece.

Error proofing refers to the elimination of error by a machine tool operator in the manual orientation of the cutting tool and/or toolholder 14 with respect to the clamping unit 16. More particularly, the present invention is directed to a method and apparatus to insure that cutting tools 12, when changed, are placed in their proper radial orientation with respect to a canister 18 of a clamping unit 16.

It will be appreciated that it is important to provide the proper cutting tool orientation with respect to the workpiece. For example, it can be important, in the case of the 4 ball KM product available from Kennametal Inc., as described in detail in U.S. Pat. Nos. 4,736,659; 4,723,877; and 4,747,735, to provide proper orientation of the ball track holes 20 in the toolholder 14 to the locking balls in the canister 18 of the clamping unit 16 for proper functioning of the cutting tool.

Referring to the figures, the present invention comprises one or more lobes 22 located on one side 24 of the canister 18 of the clamping unit 16 and one or more lobes 22a on the opposing side of the canister. In a preferred embodiment, the canister 18 includes a single lobe 22 located on one side 24 of the canister approximately 180 degrees from two lobes 22a on the opposing side of the canister. The sizes of the lobes 22 and 22a are selected so that they are balanced by design to eliminate any imbalance that may arise from high speed rotation of the toolholder 14 during use. The toolholder 14 has corresponding recesses 26 machined at the intersection of the inside diameter 28 and the rearmost end 30 of the toolholder. The recesses 26 preferably match the lobes 22 and 22a in size so that the toolholder 14 and the cutting tool 12 can only be oriented in one radial orientation, or they can be machined so that the toolholder and cutting tool can be placed in two orientations generally 180 degrees from each other. In both cases, the recesses 26 in the toolholder 14 are balanced by design to eliminate any effects on the cutting tool due to imbalance during rotational use. It will be appreciated that the recesses 26 may also be formed in the outside diameter 32 of the canister 18 and the lobes 22 and 22a may be formed in the inner diameter 28 of the toolholder 14 and function as well.

Referring to a clamping unit 16 as shown in U.S. Pat. No. 5,209,146, it will be appreciated that the present invention does not affect the taper contact area, which is important in providing consistent rigidity during rotation of the cutting tool. It will be further appreciated that the single canister 18 design described above may also be used with single orientation cutting tools or dual orientation cutting tools. The canister lobe 22 and 22a outside diameter only needs to be about 0.010 inches to about 0.020 inches larger per side than the inside diameter of the toolholder 14 for the present invention to function properly.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An apparatus for aligning a clamping unit including a canister and a toolholder including a cutting tool whereby the apparatus facilitates proper positioning of the cutting tool with respect to the canister, the apparatus comprising:
   one or more lobes located on a side of the canister; and
   one or more corresponding recesses on a side of the toolholder, wherein the recesses and the lobes are sized so that the toolholder and the cutting tool can only be oriented in either one or in two orientations 180 degrees from each other, wherein the one or more recesses receive the one or more lobes and cooperatively prevent rotational movement of the toolholder with respect to the canister and allow axial movement of the toolholder with respect to the canister.

2. The apparatus of claim 1 wherein the canister includes a single lobe located on one side of the canister approximately 180 degrees from two lobes on the opposing side of the canister.

3. The apparatus of claim 2 wherein the toolholder includes recesses corresponding in size to the lobes.

4. The apparatus of claim 3 wherein the lobes are located on the outside diameter of the canister and the recesses are located on the inside diameter of the toolholder.

5. The apparatus of claim 1 wherein the lobes outside diameter is between about 0.010 inches to about 0.020 inches larger per side than the inside diameter of the toolholder.

6. An apparatus for aligning a clamping unit including a canister and a toolholder including a cutting tool whereby the apparatus facilitates proper positioning of the cutting tool with respect to the canister, the apparatus comprising:
   one or more recesses located on a side of the canister; and
   one or more corresponding lobes on a side of the toolholder, wherein the recesses and the lobes are sized so that the toolholder and the cutting tool can only be oriented in either one radial direction or in two orientations 180 degrees from each other, wherein the one or more recesses receive the one or more lobes and cooperatively prevent rotational movement of the toolholder with respect to the canister and allow axial movement of the toolholder with respect to the canister.

7. The apparatus of claim 6 wherein the toolholder includes a single lobe located on one side of the canister approximately 180 degrees from two lobes on the opposing side of the toolholder.

8. The apparatus of claim 7 wherein the canister includes recesses corresponding in size to the lobes.

9. The apparatus of claim 6 wherein the lobes are located on the outside diameter of the toolholder and the recesses are located on the inside diameter of the canister.

10. The apparatus of claim 6 wherein the lobes outside diameter is between about 0.010 inches to about 0.020 inches larger per side than the inside diameter of the toolholder.

11. An apparatus for aligning a clamping unit including a canister and a toolholder including a cutting tool whereby the apparatus facilitates proper positioning of the cutting tool with respect to the canister, the apparatus comprising:
   one lobe located on one outside diameter of the canister and two lobes located 180 degrees from the one lobe on the opposite outside diameter of the canister; and
   two recesses on the inside diameter of the toolholder and spaced 180 degrees apart, wherein the recesses and the lobes are sized so that the toolholder and the cutting tool can only be oriented in only either one or two orientations 180 degrees from each other, wherein the one or more recesses receive the one or more lobes and cooperatively prevent rotational movement of the toolholder with respect to the canister and allow axial movement of the toolholder with respect to the canister.

12. The apparatus of claim 11 wherein the toolholder includes a single lobe located on one side of the canister approximately 180 degrees from two lobes on the opposing side of the toolholder.

13. The apparatus of claim 12 wherein the canister includes recesses corresponding in size to the lobes.

14. The apparatus of claim 11 wherein the lobes are located on the outside diameter of the toolholder and the recesses are located on the inside diameter of the canister.

15. The apparatus of claim 11 wherein the lobes outside diameter is between about 0.010 inches to about 0.020 inches larger per side than the inside diameter of the toolholder.

16. An apparatus for aligning a clamping unit including a canister and a toolholder including a cutting tool whereby the apparatus facilitates proper positioning of the cutting tool with respect to the canister, the apparatus comprising:
   one lobe located on one outside diameter of the toolholder and two lobes located 180 degrees from the one lobe on the opposite outside diameter of the toolholder; and
   two recesses on the inside diameter of the canister and spaced 180 degrees apart, wherein the recesses and the lobes are sized so that the toolholder and the canister can only be oriented in only either one or two orientations 180 degrees from each other, wherein the recesses and the lobes cooperatively prevent rotational movement of the toolholder with respect to the canister and allow axial movement of the toolholder with respect to the canister.

17. The apparatus of claim 16, wherein the lobes outside diameter is between about 0.010 inches to about 0.020 inches larger per side than the inside diameter of the toolholder.

18. An apparatus for aligning a clamping unit including a canister and a toolholder including a cutting tool whereby the apparatus facilitates proper positioning of the cutting tool with respect to the canister, the apparatus comprising:

one lobe located on the inside diameter of the toolholder and two lobes located 180 degrees from the one lobe on the opposite inside diameter of the toolholder; and two recesses on the outside diameter of the canister and spaced 180 degrees apart, wherein the recesses and the lobes are sized so that the toolholder and the canister can only be oriented in only either one or two orientations 180 decrees from each other, wherein the one or more recesses receive the one or more lobes and prevent rotational movement of the toolholder with respect to the canister and allow axial movement of the toolholder with respect to the canister.

* * * * *